United States Patent
Onaka et al.

(10) Patent No.: US 7,268,936 B2
(45) Date of Patent: Sep. 11, 2007

(54) OPTICAL AMPLIFIER HAVING POLARIZATION MODE DISPERSION COMPENSATION FUNCTION

(75) Inventors: Miki Onaka, Kawasaki (JP); Etsuko Hayashi, Kawasaki (JP); Yasushi Sugaya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/761,296

(22) Filed: Jan. 22, 2004

(65) Prior Publication Data
US 2004/0246568 A1 Dec. 9, 2004

(30) Foreign Application Priority Data
Jan. 24, 2003 (JP) .............................. 2003-015915

(51) Int. Cl.
*H04B 10/18* (2006.01)
*H01S 3/10* (2006.01)
(52) U.S. Cl. ..................... 359/341.41; 398/65
(58) Field of Classification Search ........... 359/341.41, 359/341.4, 341.42, 337; 398/65
See application file for complete search history.

(56) References Cited

U.S. PATENT DOCUMENTS

| | | | | |
|---|---|---|---|---|
| 4,898,441 A * | 2/1990 | Shimizu | ...................... | 385/11 |
| 5,696,707 A * | 12/1997 | Hentschel et al. | ............ | 702/69 |
| 5,793,512 A * | 8/1998 | Ryu | ............................. | 398/97 |
| 5,835,260 A * | 11/1998 | Kosaka et al. | ......... | 359/341.41 |
| 5,943,162 A * | 8/1999 | Kosaka et al. | ......... | 359/341.31 |
| 6,130,766 A * | 10/2000 | Cao | ............................. | 398/147 |
| 6,301,273 B1 * | 10/2001 | Sanders et al. | ................ | 372/6 |
| 6,597,494 B2 * | 7/2003 | Segi et al. | ............... | 359/341.1 |
| 2002/0018266 A1 * | 2/2002 | Ooi et al. | .................... | 359/161 |
| 2002/0027703 A1 | 3/2002 | Kinoshita et al. | | |
| 2002/0118422 A1 * | 8/2002 | Cao | .......................... | 359/161 |
| 2002/0159139 A1 * | 10/2002 | Koplow et al. | ............. | 359/342 |
| 2002/0181066 A1 * | 12/2002 | Miller | ....................... | 359/237 |
| 2003/0123142 A1 | 7/2003 | Kinoshita et al. | | |
| 2004/0190121 A1 * | 9/2004 | Popov et al. | ............... | 359/337 |
| 2005/0135762 A1 * | 6/2005 | Ikeda et al. | ................ | 385/127 |

FOREIGN PATENT DOCUMENTS

| | | |
|---|---|---|
| JP | 05-502334 | 4/1983 |
| JP | 11-312848 | 11/1999 |
| JP | 2002-078081 | 3/2000 |
| WO | WO91/09475 | 6/1991 |

* cited by examiner

*Primary Examiner*—Jack Keith
*Assistant Examiner*—Ari M. Diacou
(74) *Attorney, Agent, or Firm*—Staas & Halsey LLP

(57) ABSTRACT

An object of the present invention is to provide at low cost, a highly functional and small size optical amplifier, which realizes a polarization mode dispersion (PMD) compensation function and an optical amplifying function, with a simple construction. To this end, the optical amplifier of the present invention comprises: a polarization control section that controls the polarization state of input signal light; a PMD generation section that receives the signal light from the polarization control section at a polarization-preserving fiber thereof doped with a rare earth element, and gives a differential group delay between orthogonal polarization mode components of the signal light to perform PMD compensation and at the same time amplifies the signal light; a pumping light supply section that supplies pumping light to the polarization-preserving fiber; a monitoring section that monitors the PMD generation state of the signal light from the PMD generation section, and the like; and a control section that controls the polarization control section and the pumping light supply section based on the monitor results of the monitoring section.

18 Claims, 12 Drawing Sheets

⊗: EX. SPLICE POINT

OPTICAL AMPLIFIER HAVING POLARIZATION MODE DISPERSION COMPENSATION FUNCTION

BACKGROUND OF THE INVENTION

1. Field of the Invention

The present invention relates to an optical amplifier used in an optical communication system, and more specifically, relates to an optical amplifier which has a polarization mode dispersion compensation function, to realize high functionality and also miniaturization.

2. Description of the Related Art

The optical amplifier is one of the key components for realizing long distance and large capacity in optical communication systems. The optical amplifier is classified into, a laser amplifier which uses stimulated emission from a population inversion medium, and an amplifier based on a nonlinear optical effect such as Raman scattering and Brillouin scattering. The laser amplifier includes a rare earth element doped optical fiber amplifier and a semiconductor laser amplifier using a semiconductor amplification medium. The former operates as an optical amplifier by photoexcitation, and the latter operates as an optical amplifier by injected current excitation.

Among these optical amplifiers, the rare earth element doped optical fiber amplifier has a large advantage in performance, such as being bit rate free, having high gain, low noise, a wide band, low coupling loss, low polarization dependency and high efficiency. Of the rare earth element doped optical fiber amplifiers, an erbium-doped fiber amplifier (EDFA) is most popular, and has been put to practical use in optical fiber communication systems.

Recently, the demand for communication traffic has increased tremendously due to the popularization of the Internet. As a technique responding to this need, wavelength division multiplexing (WDM) transmission technology, in which multi-wavelength optical signals are superimposed in one optical fiber to perform communication, is now attracting public attention. As for the WDM transmission technology, a point-to-point system mainly connecting two points has already been put to practical use. Moreover, demands for expansion of the wavelength region are further increasing, for strengthening the foundation for large capacity transmission, as Dense Wavelength Division Multiplexing (DWDM). By introducing the WDM transmission technology as described above, many optical amplifiers at least corresponding to the number of wavelengths of the signal light, become necessary for a one-wave optical amplifier in a transmitter/receiver. Therefore, demands for miniaturization of the optical amplifier are increasing.

Moreover, construction of a more flexible and more economical transport network is called for as a photonic network system exceeding the range of trunk long-distance and large-capacity systems, and development of optical node technology for constructing photonic networks is under way. Specifically, development of an optical add-drop multiplexer (OADM) having a function of dropping a signal of an arbitrary wavelength or adding a signal of an arbitrary wavelength from/to a WDM ring transmission line, and an optical cross connect (OXC) apparatus having a function of switching the optical lines mutually or a function as a wavelength switch for routing the light in units of wavelength, is now under way.

Further high function and diversification, as well as high speed, low cost and high reliability are required for photonic networks which are directed towards the upcoming large-capacity information oriented society. In order to respond to such needs, it becomes necessary to apply various kinds of compensation techniques in small units, such as in units of wavelength, or in groups of several wavelengths, to precisely control transmission quality. Specifically, it becomes necessary to apply functional devices such as an optical switch, a wavelength dispersion compensator, a polarization mode dispersion (PMD) compensator, a tunable optical filter and the like, to a required application area. Moreover, an optical amplifier corresponding to one wavelength or a group of several wavelengths is required in order to compensate for a loss occurring in such a functional device, and many optical amplifiers are necessary in one node. For example, it is expected that optical amplifiers in a level of several hundreds are required in one OXC apparatus.

Since it is assumed that the optical communication system described above is led in to a metropolis (urban network), and furthermore to close to offices and houses, it is expected that the demand for small optical amplifiers will increase further. Moreover, in higher speed optical communication systems, the need for wavelength dispersion compensators and PMD compensators increases. Particularly, it is necessary to arrange a PMD compensator for each signal channel. Therefore, it can be considered that many small optical amplifiers are required for compensating for losses in these optical parts.

An optical amplifier for compensating for such losses in functional devices is the one which has an amplification band corresponding to one wavelength or a group of several wavelengths, and is aimed at miniaturization while obtaining a gain sufficient for compensating for at least the losses of the required optical parts, differently from an optical amplifier which is aimed at high performance (for example, high gain, low NF, wide band, etc.) mainly developed heretofore.

As a conventional technique relating to optical amplifiers for compensating for losses, in Japanese Unexamined Patent Publication No. 5-502334, a single optical amplifier using a remote pumping method is installed on an input side of a single optical device (such as an optical coupler or an optical branching device), to integrate the single optical amplifier and the single optical device, thereby constituting an optical device with no loss.

Moreover, the present applicant has proposed in Japanese Unexamined Patent Publication Nos. 11-312848 and 2000-078081, an optical amplifier in which dispersion compensators (DCF) are arranged between stages of a plurality of optical amplifiers, so as to enable the compensation of wavelength dispersion with respect to wideband WDM signal light.

However, the conventional technique disclosed in Japanese Unexamined Patent Publication No. 5-502334 still remains in the configuration area in which the optical amplifier and the optical device are simply connected and combined, and space-saving of the optical amplifier and the optical device has not yet been realized. Moreover, in the technique proposed in Japanese Unexamined Patent Publication Nos. 11-312848 and 2000-078081, a dispersion compensator is arranged at an optimum position in the optical amplifier, taking into consideration the characteristics of the dispersion compensator and the optical amplifier. However, it has a configuration such that the optical amplifier and the optical device are simply connected and combined, as in the case of Japanese Unexamined Patent Publication No. 5-502334, and a problem of miniaturization of the optical amplifier has not yet solved.

The present applicant has proposed a technique for realizing space-saving, in which an optical device for compensating for losses is integrally provided on an output side of an optical amplification medium by using a connection method having an excellent reflection attenuation characteristic (such as a fusion splice method or a diagonal polished connector connection method), to thereby reduce a reflecting light on the output side to the optical amplification medium by utilizing an effect of insertion loss of the optical device, so that at least an isolator on the output side, of the isolators which have been heretofore necessary, can be omitted (see Japanese Patent Application No. 2002-092443). This prior application is for providing a technique relating to the configuration of the optical device for compensating for losses, and of the optical amplifier, but the type of the optical device is not particularly limited. Therefore, there is no technical approach to make common or share the required parts and space in order to realize the miniaturization of the optical amplifier, by specifying the optical device to be integrated with the optical amplifier.

SUMMARY OF THE INVENTION

In view of the above problems, it is an object of the present invention to provide an optical amplifier having a polarization mode dispersion compensation function, in which high functionality is achieved by an integrated configuration with a polarization mode dispersion compensator, being one of optical functional devices, and miniaturization and low cost are realized by making common or sharing the required parts and space.

In order to achieve the above object, an optical amplifier having a polarization mode dispersion compensation function according to the present invention comprises: a polarization control section that controls a polarization state of input signal light; a polarization mode dispersion generation section that has an optical transmission medium which has birefringence capable of giving a differential group delay between orthogonal polarization mode components of the signal light controlled in the polarization control section, and which is doped with a rare earth element; a pumping light supply section that applies pumping light capable of pumping the rare earth element, to the optical transmission medium in the polarization mode dispersion generation section; a monitoring section that monitors a polarization mode dispersion generation state of the signal light output from the polarization mode dispersion generation section; and a control section that controls the polarization control section so that polarization mode dispersion monitored in the monitoring section is reduced.

In the optical amplifier having the above configuration, the signal light input to the polarization control section is given to the optical transmission medium having birefringence and doped with the rare earth element, in the polarization mode dispersion generation section, after the polarization state thereof is controlled according to the signal from the control section. The pumping light from the pumping light supply section is supplied to the polarization mode dispersion generation section, so that the rare earth element in the optical transmission medium is pumped. Therefore, the signal light transmitted to the polarization mode dispersion generation section is amplified by a stimulated emission action of the rare earth element, while the differential group delay is provided between the orthogonal polarization modes depending on the polarization state of the signal light, so that compensation for the polarization mode dispersion of the signal light monitored in the monitoring section, and amplification of the signal light which compensates for at least a loss due to, for example, the compensation for the polarization mode dispersion are performed at the same time. As a result, the optical amplifier that realizes high functionality and miniaturization by the integrated configuration can be realized.

Other objects, features and advantages of the present invention will become apparent from the following description of the embodiments, in conjunction with the appended drawings.

DETAILED DESCRIPTION OF THE INVENTION

Embodiments of the present invention will be described hereunder based on the drawings. Same numeral references denote same or corresponding parts throughout the figures.

Figure 1:
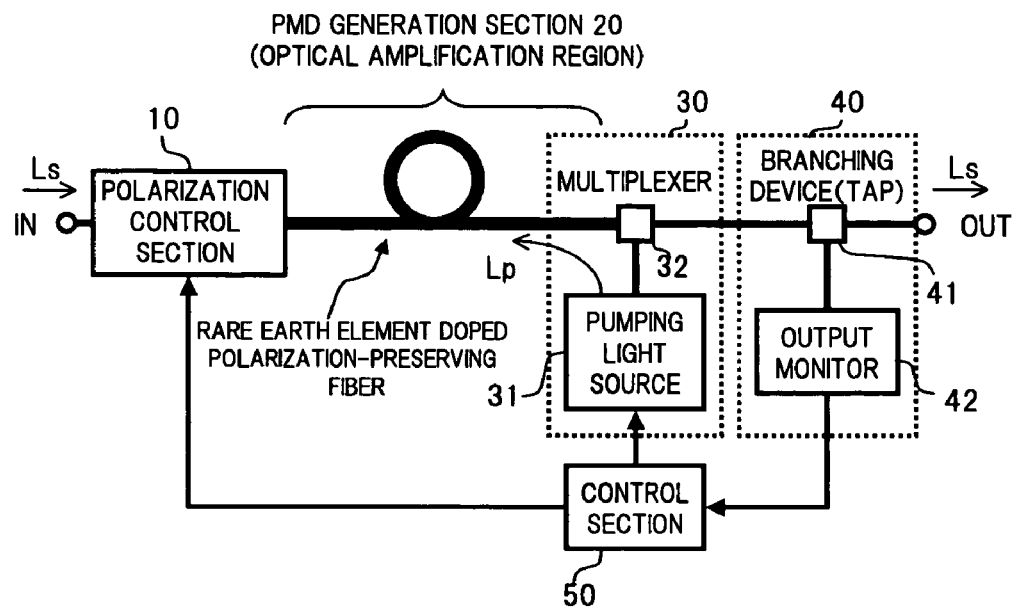
FIG. 1 is a functional block diagram showing the configuration of a first embodiment of an optical amplifier according to the present invention.

FIG. 1 is a functional block diagram showing the configuration of a first embodiment of an optical amplifier according to the present invention.

In FIG. 1, the optical amplifier in this embodiment comprises, for example: a polarization control section 10 that controls a polarization state of signal light Ls given to an input terminal IN; a PMD generation section 20 that receives the signal light Ls output from the polarization control section 10 at an optical transmission medium thereof having birefringence and doped with at least a rare earth element (ex. Er), and gives a required differential group delay (DGD) between orthogonal polarization mode components of the signal light Ls, to amplify the signal light Ls while performing PMD compensation; a pumping light supply section 30 that supplies pumping light to the optical transmission medium in the PMD generation section 20 to pump the rare earth element; a monitoring section 40 that monitors the power and PMD generation state of the signal light Ls sent from the PMD generation section 20 to an output terminal OUT; and a control section 50 that controls the polarization control section 10 and the pumping light supply section 30 based on a monitoring result of the monitoring section 40.

The polarization control section 10 is a known optical device, which adjusts an angle of polarization plane of the signal light Ls given thereto via the input terminal IN, in accordance with a control signal from the control section 50. The polarization control section 10 corresponds to a polarization control circuit (polarization controller) used in the PMD compensator described in Japanese Patent No. 3230784 and Japanese Unexamined Patent Publication No. 2000-312181.

Figure 2:
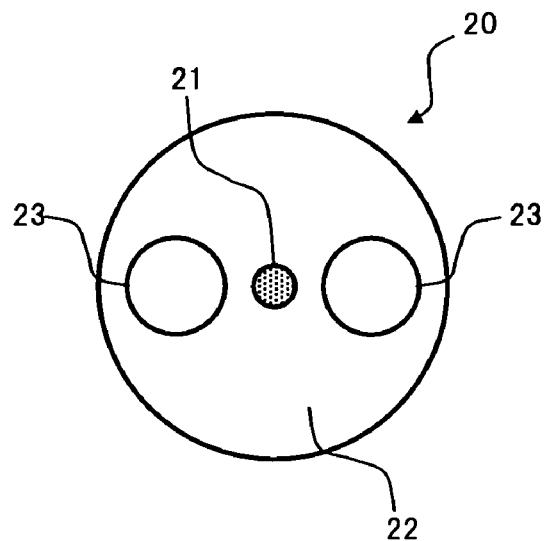
FIG. 2 shows one example of a sectional structure of PANDA type polarization-preserving fiber used in the first embodiment.

In the PMD generation section 20, as the optical transmission medium having birefringence, for example, a polarization-preserving fiber is used and a core portion of the polarization-preserving fiber is doped with a rare earth element. The polarization-preserving fiber is an optical fiber in which a propagation constant difference is generated between orthogonal polarization modes so that coupling from one polarization mode to the other polarization mode is suppressed to increase the polarization-preserving capacity. The structure of the polarization-preserving fiber includes a PANDA type, an elliptical clad type and the like. FIG. 2 shows one example of the sectional structure of PANDA type polarization-preserving fiber. In the figure, reference numeral 21 denotes a core, 22 denotes a cladding, and 23 denotes a stress imparting section. In this embodiment, the polarization-preserving fiber used for the PMD generation section 20 also has a function as an optical amplification medium by doping a light propagation region centering on the core 21 with a rare earth element. Specific examples of the rare earth element doped on the core 21 include erbium (Er), praseodymium (Pr), thorium (Th), and co-doping of erbium and ytterbium (Er—Yb). However, the rare earth element is not limited to the above specific examples.

The pumping light supply section 30 has, for example, a pumping light source 31 which generates pumping light Lp having a required wavelength capable of pumping the rare earth element doped on the polarization-preserving fiber, and a multiplexer 32 which supplies the pumping light Lp to the polarization-preserving fiber in the PMD generation section 20. Here is shown an example of backward pumping, in which the multiplexer 32 is arranged on a signal light output side of the polarization-preserving fiber, and the pumping light Lp is propagated in a direction opposite to a propagation direction of the signal light Ls. For the pumping light source 31, for example, a semiconductor pump laser or a fiber Raman laser can be used.

The configuration as described above in which the rare earth element doped polarization-preserving fiber is used, and the pumping light is supplied thereto to constitute the optical amplifier is known from Japanese Unexamined Patent Publication Nos. 2001-244535, 7-142798 and 5-45682. However, these known optical amplifiers do not have the PMD compensation function.

Here, specific configuration examples of the multiplexer 32 used in the pumping light supply section 30 will be described, with reference to FIG. 3 and FIG. 4.

Figure 3:
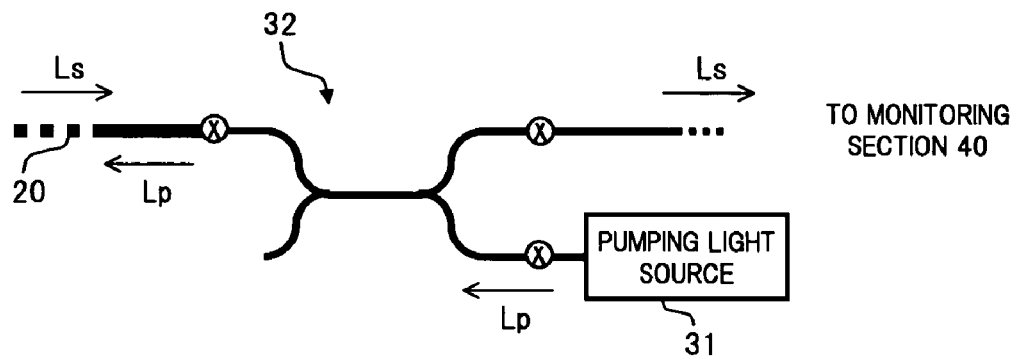
FIG. 3 shows one example in which a fiber type fused WDM coupler is used as a multiplexer in a pumping light supply section, in the first embodiment.

The configuration shown in FIG. 3 is one example in which a fiber-type fused WDM coupler is used for the multiplexer 32. In this configuration example, an output end of the rare earth element doped polarization-preserving fiber in the PMD generation section 20 is optically connected to one port of the fused WDM coupler, and one end of an optical path connected to the monitoring section 40 is optically connected to one of two ports which are located opposite to the one port, with a pigtail fiber or the like in the pumping light source 31 being fusion spliced to the other port.

Figure 4:
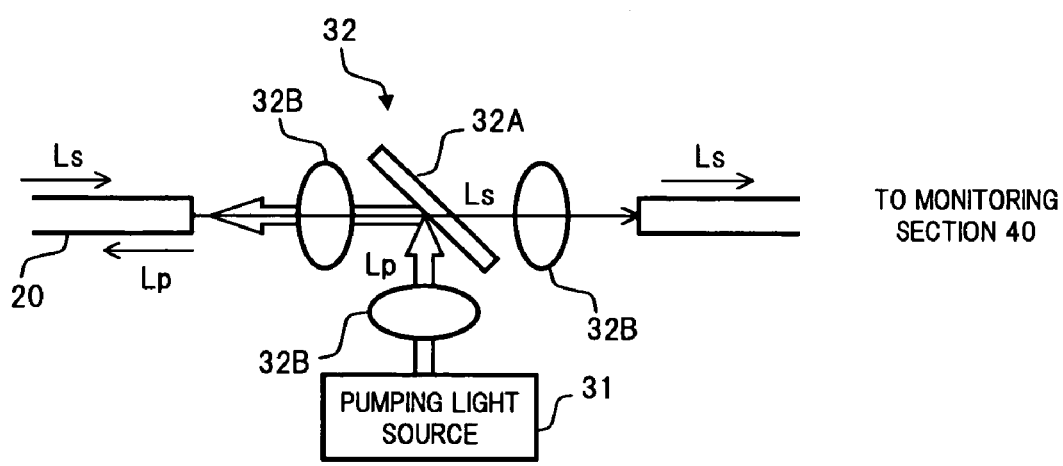
FIG. 4 shows one example in which a spatial lens coupling type configuration is applied to the multiplexer in the pumping light supply section, in the first embodiment.

The configuration shown in FIG. 4 is one example of the multiplexer 32 having a spatial lens coupling type configuration, which uses a wavelength multiplexing separation film 32A and a plurality of lenses 32B. The wavelength multiplexing separation film 32A has a property such that it reflects the pumping light Lp at a high reflectivity, and transmits the signal light Ls. In this configuration example, the pumping light Lp incident on the wavelength multiplexing separation film 32A via the lens 32B from the pumping light source 31 is reflected by the wavelength multiplexing separation film 32 and guided to the polarization-preserving fiber in the PMD generation section 20. On the other hand, the signal light Ls incident on the wavelength multiplexing separation film 32A via the lens 32B from the polarization-preserving fiber is transmitted through the wavelength multiplexing separation film 32A and guided to the optical path connected to the monitoring section 40.

FIG. 3 and FIG. 4 illustrate examples of backward pumping, but this configuration can be applied likewise to forward pumping described later.

Figure 5:
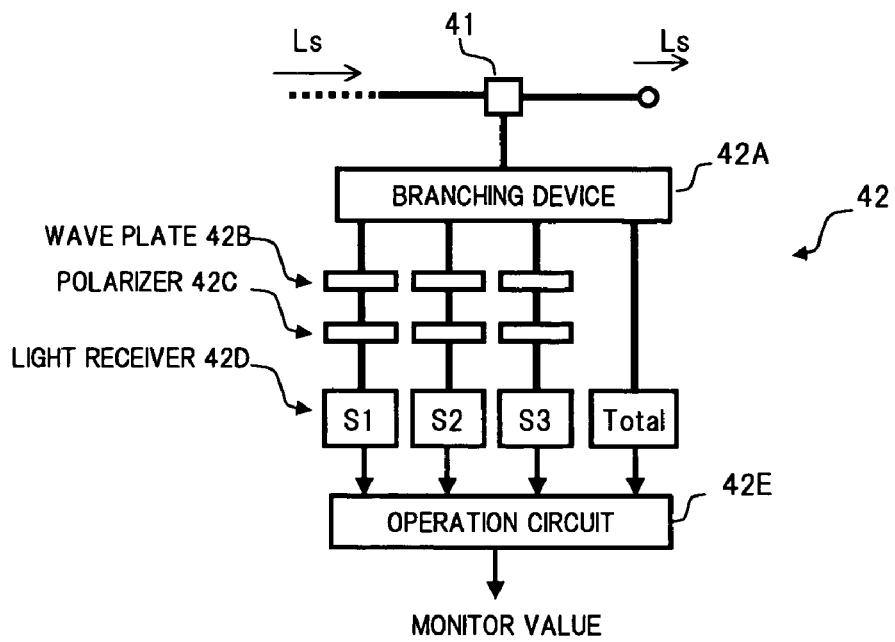
FIG. 5 shows a specific configuration example of a monitoring section used in the first embodiment.

The monitoring section 40 (FIG. 1) has a branching device 41 which branches a part of the signal light Ls which is output from the PMD generation section 20 and passes through the multiplexer 32 in the pumping light supply section 30 to be sent to the output terminal OUT, as monitor light, and an output monitor 42 which monitors the power and PMD generation state of the signal light Ls, using the monitor light branched by the branching device 41. A known PMD monitoring method may be applied to the output monitor 42, as disclosed in Kikuchi et al., "PMD Detection Sensitivity of Degree of Polarization Method for PMD Compensation", 1999 The Institute Of Electronics, Information And Communication Engineers, Society Conference, B-10-68. The specific configuration of the output monitor 42 is, for example as shown in FIG. 5, such that the monitor light branched by the branching device 41 is further branched into four lights by a branching device 42A, three lights thereof are sent to a light receiver 42D via a wave plate 42B and a polarizer 42C, respectively, and the remaining one light is directly transmitted to the light receiver 42D, and a degree of polarization (DOP) is calculated by an operation circuit 42E based on the powers of the lights having different polarization states detected by the respective light receivers 42D, to thereby monitor the PMD generation state of the signal light Ls. However, the configuration of the output monitor applicable to the present invention is not limited to the example shown in FIG. 5.

The control section 50 (FIG. 1) controls an angle of polarization plane of the signal light Ls adjusted in the polarization control section 10, based on the monitoring result in the monitoring section 40, so that PMD remaining in the signal light Ls is further decreased. Moreover, the control section 50 controls the pumping light source 31 in the pumping light supply section 30 to adjust the gain setting of the present optical amplifier, so that the signal light Ls output from the output terminal OUT reaches a required level.

Although not shown in the configuration example in FIG. 1, an optical isolator that allows the signal light Ls to pass only from the input side to the output side may be inserted, according to need (for example, when a high gain operation is required), between the polarization control section 10 and the PMD generation section 20, and between the multiplexer 32 in the pumping light supply section 30 and the optical branching device 41 in the monitoring section 40.

The operation of the optical amplifier in the first embodiment will be described below.

In the optical amplifier, when the signal light Ls is input to the polarization control section 10 via the input terminal IN, the angle of polarization plane of the signal light Ls is adjusted. The adjustment of the angle of polarization plane in the polarization control section 10 is controlled such that the PMD, which is generated in the signal light Ls as a result that the signal light Ls is propagated through an optical transmission path (not shown) connected to the input terminal IN, is reduced by a differential group delay given between the orthogonal polarization mode components in the PMD generation section 20 arranged on the subsequent stage of the polarization control section 10. Here, the operation of the polarization control section 10 is feedback controlled by the control section 50, so that a PMD generation quantity monitored in the monitoring section 40 arranged on the output stage is decreased to be closer to zero.

Here, the PMD generated in the signal light Ls applied to the input terminal IN will be briefly explained. For example, in the case where a single mode optical fiber (SMF), widely and typically used as the optical transmission path, is connected to the input terminal IN, two modes each having two orthogonal polarization planes exist in the SMF, and the degenerate state of the orthogonal polarization modes is released due to the birefringence which occurs since the sectional structure of the SMF is not a perfect circle, to thereby generate PMD having a different group velocity for each polarization. More specifically, if it is assumed that a polarization transmission characteristic of the SMF is approximately 0.5 ps/km$^{1/2}$, then PMD of approximately 8.7 ps is generated in the signal light Ls which has been propagated through the SMF having a length of for example 300 km, and this PMD degrades a transmission characteristic of the signal light Ls. The PMD is changed timewise due to disturbance such as temperature change, and hence it is necessary to perform PMD compensation dynamically. In this embodiment, therefore, the feedback control of the polarization control section 10 is performed based on the monitoring result by the monitoring section 40.

The signal light Ls in which the angle of polarization plane has been optimized in the polarization control section 10 is propagated in the core of the rare earth element doped polarization-preserving fiber in the PMD generation section 20. Pumping light Lp generated in the pumping light source 31 is supplied to the polarization-preserving fiber from the backward via the multiplexer 32, so that the rare earth element doped on the core is in a pumped state. As a result, the differential group delay is given between the orthogonal polarization modes of the signal light Ls propagated through the polarization-preserving fiber in the PMD generation section according to the angle of polarization plane, to thereby perform PMD compensation, and at the same time, the signal light Ls is amplified up to a required level by stimulated emission from the pumped rare earth element.

The PMD quantity that can be compensated for in the PMD generation section 20 depends largely on the length of the polarization-preserving fiber. Typically, it is considered that the length of the polarization-preserving fiber required for imparting PMD of about 20 ps is about 20 m. In order to compensate for PMD of 8.7 ps generated in the signal light Ls input to the input terminal IN, as in the above specific example, it is necessary to use a polarization-preserving fiber having the length of about 10 m. On the other hand, an amplification gain of the signal light Ls in the PMD generation section 20 depends largely on the length of the optical amplification medium (rare earth element doped polarization-preserving fiber), and therefore, it is difficult to generate a required gain unless the optical amplification medium has a certain length. For example, the length of the optical amplification medium used in the known erbium doped optical fiber amplifier is several 10 meters. The length of this optical amplification medium is of the same level as the length of the polarization-preserving fiber required for the PMD compensation. Paying attention to this common point in length, in this embodiment, the polarization-preserving fiber for PMD compensation is doped with a rare earth element so that it also functions as the optical amplification medium. As a result, an integrated configuration in which space-saving is achieved by sharing optical parts can be easily realized.

The amplification gain of the signal light Ls in the PMD generation section 20 is set to a gain that can compensate for at least an insertion loss for when the present optical amplifier is considered to be a PMD compensator. Specifically, the insertion loss in the known PMD compensator is considered typically to be about 5 to 10 dB, although depending on the applied technique and the PMD compensation quantity. Therefore, for example, the pumping light Lp that can obtain at least a gain of the similar level is supplied to the PMD generation section 20. Here, the power of the signal light Ls amplified in the PMD generation section 20 is monitored in the monitoring section 40, and the drive state of the pumping light source 31 is feedback controlled by the control section 50, so that a required optical power level can be obtained (for example, the power of the signal light Ls at the time of output, becomes substantially equal to the power at the time of input, or a desired level exceeding the power at the time of input).

It is preferable that in the feedback control of the pumping light source 31, an ALC controlling the output level of the signal light Ls constant is performed. Thus, since the output level becomes constant with respect to an arbitrary input level of the signal light Ls, a stable output can be obtained. Moreover, it is preferable to set the output level of the ALC, taking the sensitivity of the output monitor 42 into consideration. In other words, if the input level of the monitor light (branched light of the signal light Ls) given to the output monitor 42 becomes too low, the optical power and the PMD cannot be monitored accurately, due to an influence of a dark current or the like generated in the light receiver. Moreover, if the input level to the output monitor 42 becomes too high, the light receiver becomes a saturated state, and the optical power and the PMD cannot be monitored accurately. Therefore, the output level of the ALC is set so that the level of the monitor light input to the output monitor 42 becomes an appropriate value based on a branching ratio of the branching device 41 used in the monitoring section 40, and the minimum and maximum input levels of the output monitor 42, so as to avoid the above situation. As a result, even if the input level of the signal light Ls is changed in a wide range, the PMD compensation and optical amplification can be performed stably.

As described above, according to the optical amplifier of the first embodiment, with regard to the optical amplifier for compensating for the insertion loss, which was heretofore separately provided to the PMD compensator, an integrated configuration is realized such that a PMD generation medium and an optical amplification medium are formed from a common part using a rare earth element doped polarization-preserving fiber, and also the monitoring section 40 and the control section 50 are also shared, thereby enabling to achieve space-saving. Thus, it becomes possible to provide a high functionality and small-size optical amplifier, in which the PMD compensation function and the optical amplification function are realized with a single configuration. Moreover, since both the polarization control section 10 and the pumping light source 30 are feedback controlled at the same time, based on the monitoring results of the output monitor 42, the compensation for PMD occurring in the signal light Ls and the compensation for the loss occurring due to the PMD compensation can be reliably performed in stable. Thus, if the PMD compensation and loss compensation are performed at the same time in the optical amplifier, problems such as deterioration in the transmission characteristic due to a nonlinear effect of the optical transmission path, deterioration in the optical amplifying characteristic due to an excessive gain increase in an inline optical amplifier (optical amplifying repeater), deterioration in reliability, and cost increase can be avoided, as compared to, for example, the case where the insertion loss of the PMD compensator arranged on the reception side of the optical communication system is compensated for by raising the output level of the inline optical amplifier.

Figure 6:
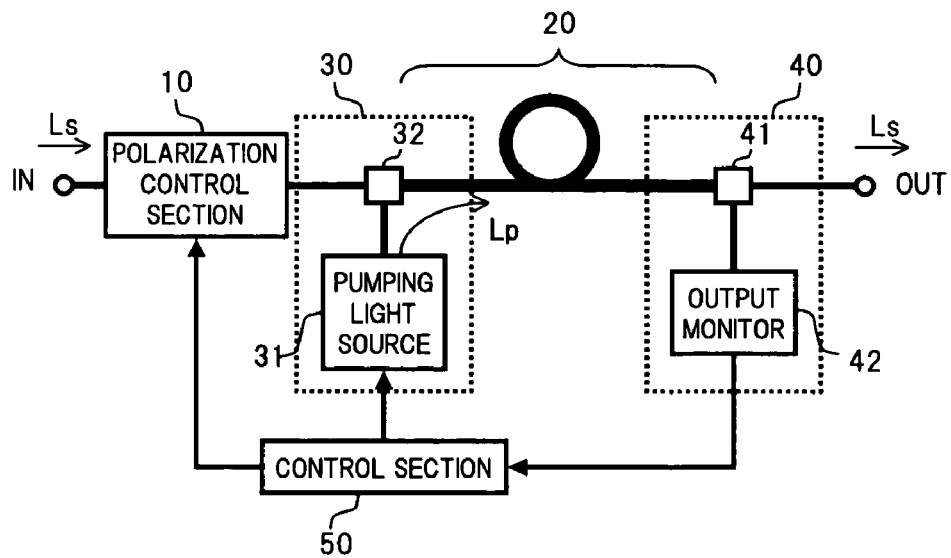
FIG. 6 is a functional block diagram showing a configuration example of a forward pumping type related to the first embodiment.
Figure 7:
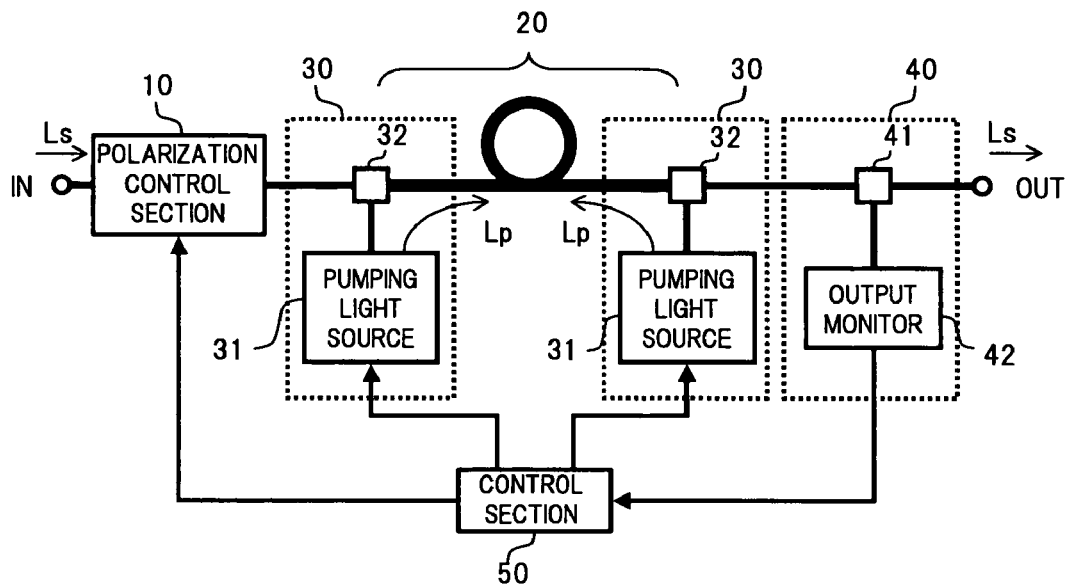
FIG. 7 is a functional block diagram showing a configuration example of a bi-directional pumping type related to the first embodiment.

In the first embodiment, the configuration example of backward pumping has been described, but the present invention is not limited thereto, and for example as shown in FIG. 6, as a matter of course, a forward pumping configuration may be used, in which the multiplexer 32 is arranged on the signal light input side of the rare earth element doped polarization-preserving fiber in the PMD generation section 20, and the pumping light Lp is propagated in the same direction as the propagation direction of the signal light Ls. Moreover, for example as shown in FIG. 7, a bi-directional pumping configuration is also possible, in which the pumping light Lp is supplied from both the signal light input side and output side of the polarization-preserving fiber.

A second embodiment of the optical amplifier according to the present invention will be described below.

Figure 8:
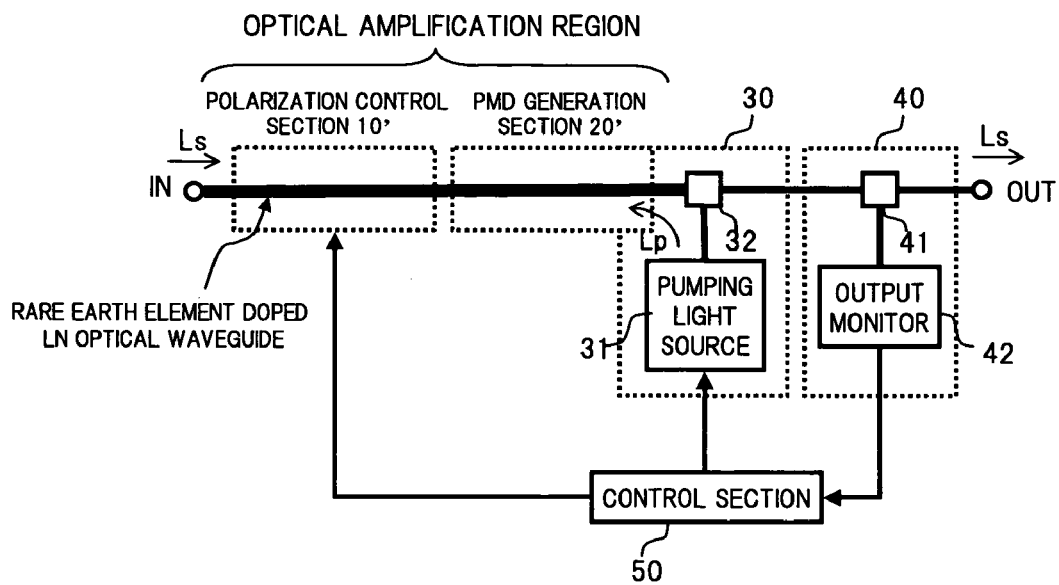
FIG. 8 is a functional block diagram showing the configuration of a second embodiment of the optical amplifier according to the present invention.

FIG. 8 is a functional block diagram showing the configuration of the optical amplifier of the second embodiment.

In FIG. 8, a difference of the configuration of the optical amplifier in the second embodiment from that of the first embodiment is that a polarization control section 10' and a PMD generation section 20' constructed by using birefringence of an optical waveguide formed on a crystalline substrate formed of, for example, lithium niobate ($LiNbO_3$: LN) and the like are provided, instead of the polarization control section 10 and the PMD generation section 20. Other than these sections, the respective configurations of the pumping light supply section 30, the monitoring section 40 and the control section 50 are the same as those in the first embodiment, and hence description thereof is omitted here.

Figure 9:
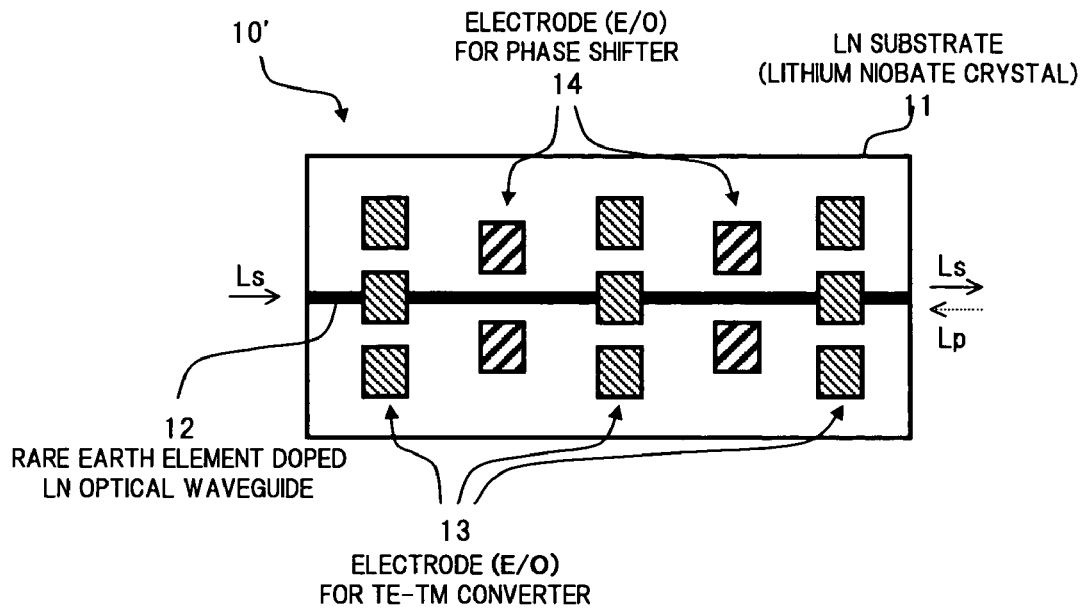
FIG. 9 shows one example of an LN waveguide-type polarization control section used in the second embodiment.

As the configuration of the LN waveguide-type polarization control section 10', there is known a configuration in which a TE-TM mode converter and a phase shifter are combined, and a configuration in which a crystalline axis is rotated to realize a wave plate with a waveguide. Here, for example as shown in FIG. 9, it is assumed that a rare earth element doped LN waveguide 12 is formed on an X-cut LN substrate 11, and a TE-TM mode converter and a phase shifter are alternately arranged along the LN waveguide, to constitute the polarization control section 10'. The TE-TM mode converter on each stage gives a required electric signal controlled in accordance with the output signal from the control section 50 to three electrodes 13 provided in a direction orthogonal to the longitudinal direction of the LN waveguide 12, to thereby perform TE-TM mode conversion of the signal light Ls being propagated through the LN waveguide 12. Moreover, the phase shifter on each stage gives a required electric signal controlled in accordance with the output signal from the control section 50 to two electrodes 14 provided in each side of the LN waveguide 12, to thereby shift the phase of the signal light Ls being propagated through the LN waveguide 12.

Figure 10:
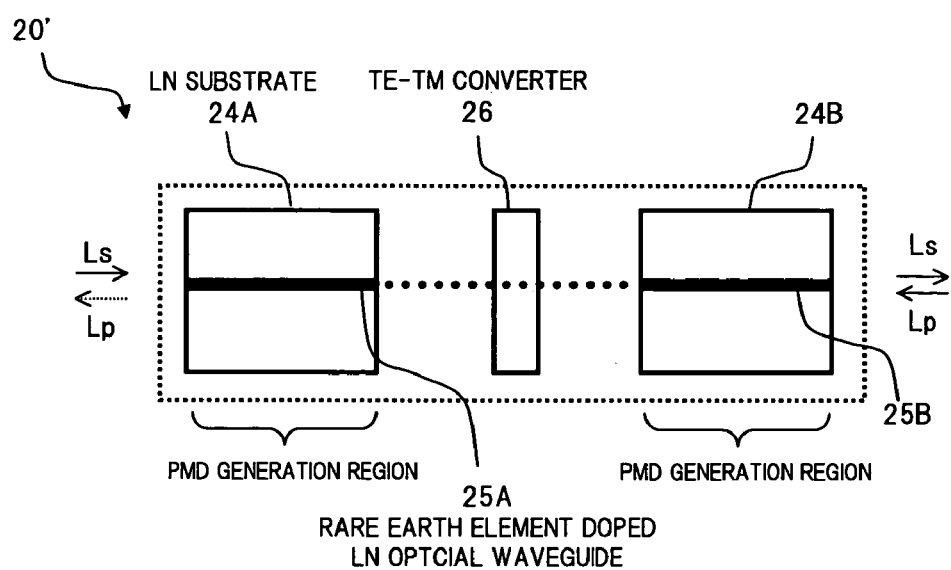
FIG. 10 shows one example of an LN waveguide-type PMD generation section used in the second embodiment.

For the LN waveguide-type PMD generation section 20', for example as shown in FIG. 10, a configuration in which a TE-TM mode converter 26 is provided between two LN substrates 24A and 24B on which rare earth element doped optical waveguides 25A and 25B are respectively formed can be used. For optical waveguide means between the LN substrates 24A and 24B via the TE-TM mode converter 26, optional means such as a space, a fiber, or a waveguide may be appropriately selected.

In the polarization control section 10' and the PMD generation section 20', as a technique for realizing the rare earth element doped LN waveguide, for example, a technique disclosed in I. Baumann et al., "Acoust Tunable Ti:Er:$LiNbO_3$-Waveguide Laser", ECOC '94, pp. 99-102, or in H. Suche, "High-speed Er-doped $LiNbO_3$ Waveguide Lasers", IPR '99, RtuG3-1 pp. 222-224 can be applied.

Moreover, in the polarization control section 10' and the PMD generation section 20' in this embodiment, there is shown an example in which the rare earth element is doped only on the optical waveguides 12, 25A and 25B formed on the LN substrates 11, 24A and 24B, however, the rare earth element may be doped on the whole LN substrates 11, 24A and 24B. Furthermore, the configuration of the polarization control section 10' and the PMD generation section 20' in the present invention is not limited to the example shown in FIG. 9 and FIG. 10, and a known configuration can be applied.

Figure 11:
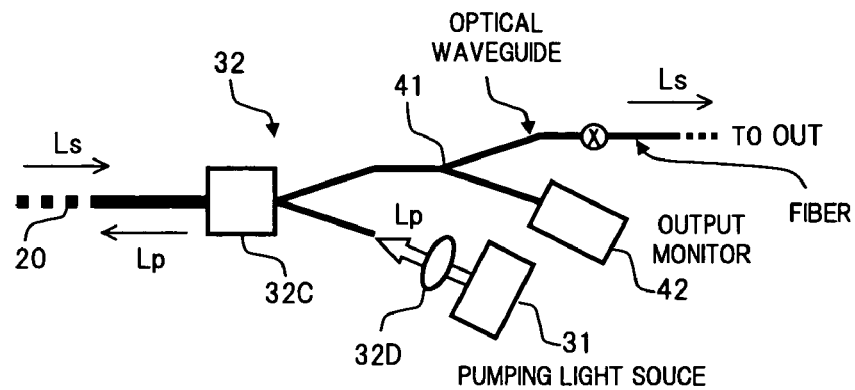
FIG. 11 shows one example in which the waveguide-type configuration is applied to a multiplexer in the pumping light supply section and a branching device in a monitoring section in the second embodiment.

For the configuration of the multiplexer 32 which supplies the pumping light Lp generated in the pumping light source 31 to the LN waveguide 25B in the PMD generation section 20' as described above, for example, the respective configurations shown in FIG. 3 and FIG. 4 can be used. Moreover, for example as shown in FIG. 11, the multiplexer 32 may have a waveguide type configuration. In the waveguide type configuration, a wavelength selective mode coupling section 32C is formed at a Y branching portion in the optical waveguide, and the pumping light Lp incident on one branch port of the Y branch via a lens 32D from the pumping light source 31 is guided to the LN waveguide 25B in the PMD generation section 20', through the wavelength selective mode coupling section 32C. On the other hand, the signal light Ls incident on the waveguide type multiplexer 32 from the LN waveguide 25B is sent to the other branch port of the Y branch via the wavelength selective mode coupling section 32C. Furthermore, in FIG. 11, there is shown a configuration in which the branching device 41 in the monitoring section 40 is integrated as the waveguide type, and the signal light Ls sent to the other branch port of the Y branch on the previous stage is branched at the Y branch on the subsequent stage which functions as the branching device 41, and the branched lights are respectively guided to the output terminal OUT and the output monitor 42.

The operation of the optical amplifier in the second embodiment will be described below.

In the optical amplifier having the above configuration, in addition to the LN waveguides 25A and 25B in the PMD generation section 20', the LN waveguide 12 in the polarization control section 10' is also doped with a rare earth element, and the backward pumping light Lp from the pumping light supply section 30 is supplied to the LN waveguide 12 as well as the LN waveguides 25B and 25A. Therefore, the signal light Ls input to the input terminal IN is amplified not only in the PMD generation section 20' but also in the polarization control section 10'.

It is said that the PMD quantity given in the LN waveguide-type PMD generation section 20' is typically about 2.5 ps per length of 1 cm of the LN waveguide. Therefore, for example, in the case where the PMD compensation for the signal light Ls in which PMD of 20 ps is generated is to be performed, the length of the LN waveguide in the PMD generation section 20' needs to be about 10 cm. The length of the LN waveguide becomes very short as compared with the case where PMD is generated by using the polarization-preserving fiber described above, and hence it is very advantageous in miniaturization and space-saving.

On the other hand, in the PMD generation section 20' having a short LN waveguide as described above, since the length of the rare earth element doped portion also becomes short, then even if an optical amplification region is extended to the polarization control section 10', the operation with high gain becomes difficult. In order to increase the gain when a short optical amplification medium is used, for example, a method in which the doping concentration of the rare earth element is increased, or a method in which an absorption factor of the pumping light is improved, using the Er—Yb co-doped amplification medium, can be applied. As a specific example, when erbium is doped in the concentration of from 3000 to 5000 ppm in an LN waveguide of about 10 cm, a gain of about 5 to 10 dB can be obtained. However, when a rare earth element is doped in the high concentration, it is necessary to pay attention to an influence of concentration quenching, which decreases the gain due to the interaction between the rare earth elements.

As described above, in the optical amplifier in which the LN waveguide-type polarization control section 10' and PMD generation section 20' are applied, the amplification gain of the signal light Ls is decreased, but it is still possible to obtain a gain for compensating for the insertion loss for when the optical amplifier is considered to be a PMD compensator. Moreover, in the optical amplifier which operates with a relatively low gain, since the optical isolator, being the essential component at the time of high gain operation, can be omitted, miniaturization and low cost of the optical amplifier can also be achieved. Furthermore, the PMD compensation by the LN waveguide-type polarization control section 10' and PMD generation section 20' has advantages such that for example, a response speed of 1 µs or less can be obtained, and a return loss of higher than 45 dB can be obtained. In addition, a smaller optical amplifier can be realized by making best use of the advantageous features for integration of the LN waveguide, and integrating the required parts, such as the pumping light supply section 30 and the monitoring section 40, in the waveguide configuration.

The backward pumping configuration example has been described in the second embodiment, but the present invention is not limited thereto, and the forward pumping or bi-directional pumping configuration is also possible, as in the case shown in FIG. 6 or FIG. 7.

Figure 12:
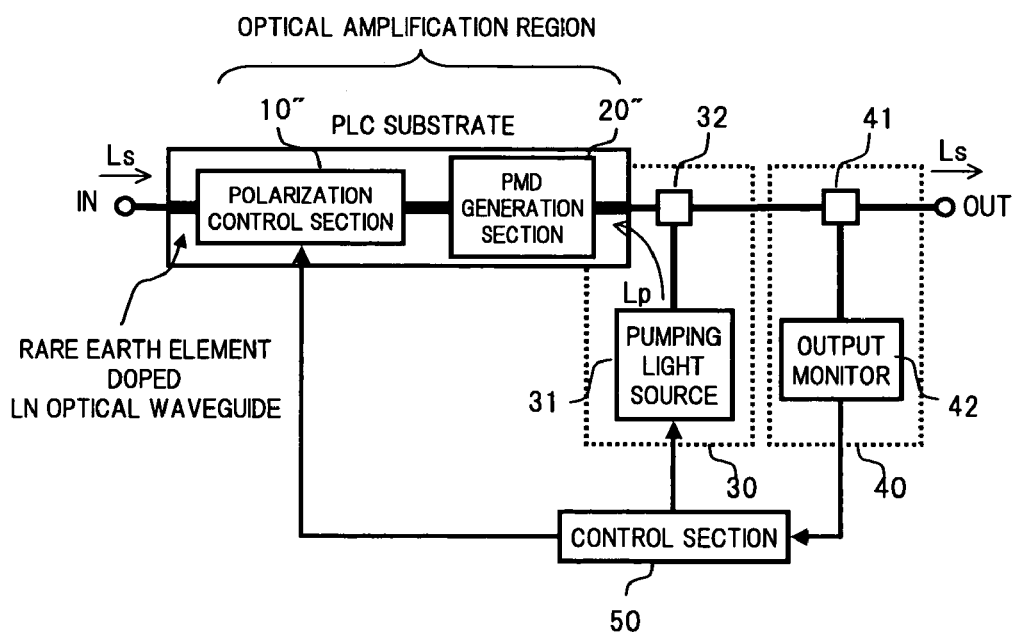
FIG. 12 is a functional block diagram showing a configuration example of a PLC type related to the second embodiment.

In the second embodiment, the LN waveguide-type polarization control section 10' and the PMD generation section 20' are constructed by using the optical waveguide formed on the LN substrate. Likewise, for example as shown in FIG. 12, a configuration of a planar lightwave circuit (PLC) can be applied, in which a glass waveguide is formed on a silicon substrate, and the refractive index thereof is changed by controlling the temperature or the like. This PLC-type polarization control section 10" and PMD generation section 20" have advantages such that miniaturization by integrating optical parts is possible, and the response speed of 10 ms or less can be obtained.

A third embodiment of the optical amplifier according to the present invention will be described below.

In the integrated configuration as described in the first and the second embodiments in which the PMD compensation and optical amplification are performed at the same time, in the respective configurations of the forward pumping type as shown in FIG. 6, and the bi-directional pumping type as shown in FIG. 7, there is a possibility that leaked light of the pumping light Lp being propagated in the same direction as the signal light Ls is input to the monitoring section 40, to decrease the monitoring accuracy of the PMD in the output monitor 42. In the third embodiment, an improvement example will be described, for preventing a decrease in the monitoring accuracy due to the influence of the leaked light of the pumping light Lp (residual pumping light).

Figure 13:
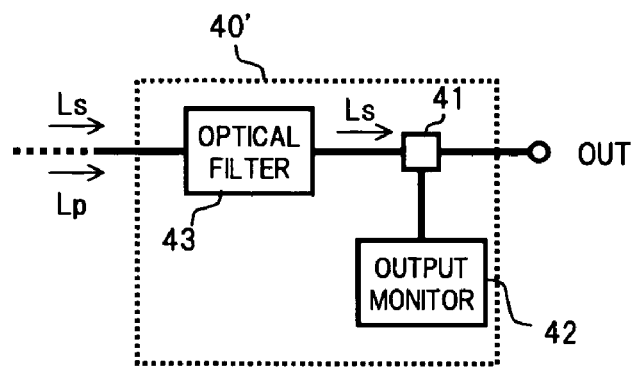
FIG. 13 is a block diagram showing the configuration of a monitoring section used in a third embodiment of the optical amplifier according to the present invention.

FIG. 13 is a block diagram showing the configuration of the monitoring section used in the optical amplifier of the third embodiment.

In FIG. 13, a monitoring section 40' applied to the present optical amplifier is formed such that an optical filter 43 which transmits the signal light Ls but intercepts the pumping light Lp is inserted in the optical path prior to the branching device 41. The configuration of the branching device 41 and the output monitor 42, and the configuration of the other parts of the optical amplifier other than the monitoring section 40' are the same as those in the first or second embodiment, and hence the description thereof is omitted.

Figure 14:
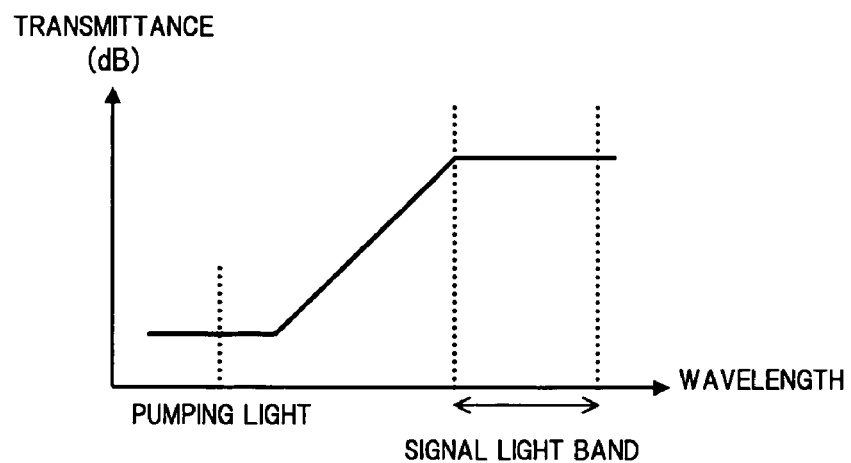
FIG. 14 shows one example of a transmission characteristic of an optical filter used in the third embodiment.

The optical filter 43 is a typical optical filter having a filter property, for example as shown in FIG. 14, such that the transmittance thereof is high with respect to a wavelength band of the signal light Ls, and low with respect to a wavelength of the pumping light Lp. Specific examples of the optical filter 43 include a dielectric multi-layer film, a fused coupler, and a filter using a fiber Bragg grating or the like. However, the optical filter 43 is not limited to the above specific examples.

In the monitoring section 40' having such a configuration, both of the signal light Ls which has been propagated through the polarization control section 10 and the PMD generation section 20, thereby subjected simultaneously to the PMD compensation and the optical amplification, and the leaked light of the pumping light Lp being propagated in the same direction as the signal light Ls are input to the optical filter 43. In this optical filter 43, in accordance with a filter characteristic shown in FIG. 14, the signal light Ls is sent to the branching device 41, and the leaked light of the pumping light Lp is intercepted. A part of the signal light Ls transmitted through the optical filter 43 is branched, as monitor light, in the branching device 41, to be sent to the output monitor 42. In the output monitor 42, the monitor light from the branching device 41 is used to monitor the PMD generation state and the output power of the signal light Ls.

According to the optical amplifier of the third embodiment, also in the forward pumping or bi-directional pumping configuration, the PMD generation state of the signal light Ls can be monitored at high accuracy, without being affected by the leaked light of the pumping light Lp.

Figure 15:
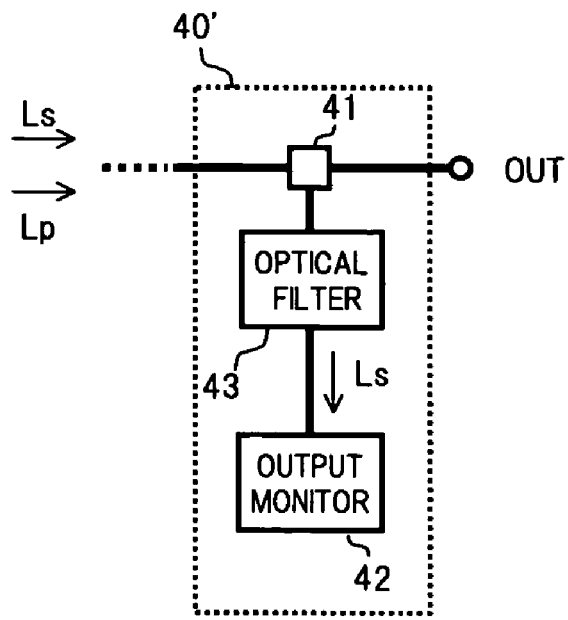
FIG. 15 is a block diagram showing another arrangement example of the optical filter related to the third embodiment.
Figure 16:
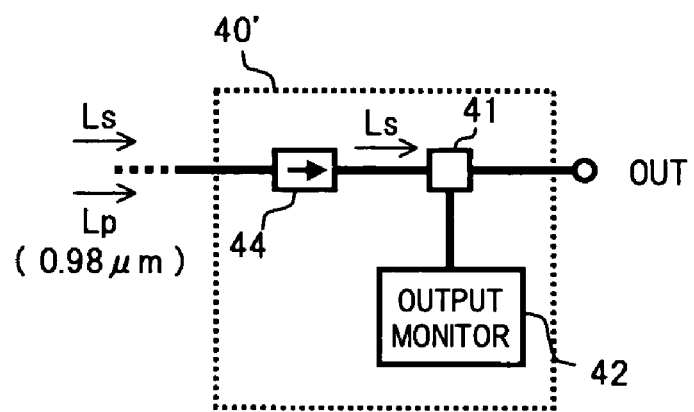
FIG. 16 is a block diagram showing one example using an optical isolator, instead of the optical filter, related the third embodiment.

In the third embodiment, the optical filter 43 is arranged on the optical path of the main signal system prior to the branching device 41, but the optical filter 43 may be arranged on the optical path of the monitor system between the branching device 41 and the output monitor 42, for example as shown in FIG. 15. Moreover, as shown in FIG. 16, it is possible to dispose an optical isolator 44 in which a large loss is generated in a wavelength band corresponding to the pumping light Lp, instead of the optical filter 43. Specifically, in the case where the optical amplification is performed on the signal light Ls of a 1.55 μm band by the pumping light Lp of 0.98 μm, since a loss of about 50 dB is caused in the vicinity of 0.98 μm, an optical isolator for the 1.55 μm band is suitable as a device for intercepting the pumping light Lp. If the optical isolator 44 is provided as described above, since the reflecting light on the output side of the optical amplification medium is intercepted, it becomes possible to obtain an effect that a stable optical amplification characteristic can be obtained even at the time of high gain operation.

In the third embodiment, the individual optical filter 43 is added to the monitoring section 40, but for example, a grating may be directly formed on the optical transmission medium (a polarization-preserving fiber or optical waveguide doped with a rare earth element) in the PMD generation section 20 connected to the monitoring section 40, thereby enabling realization of the same filter property as that of the optical filter 43. Moreover, an absorber doped with a rare earth element (for example, ytterbium (Yb) or boron (B) for a pumping light of 0.98 μm) which absorbs light in the wavelength band corresponding to the pumping light, may be disposed in the optical path of the main signal system or the monitor system, instead of the optical filter 43. In addition, an optical filter film having the same property as that of the optical filter 43 may be deposited on the respective optical parts constituting the monitoring section 40. As a specific example in this case, for the output monitor 42 having the configuration as shown in FIG. 5, the optical filter film may be deposited on the polarizer 42C formed by using glass crystals.

Next, a fourth embodiment of the optical amplifier according to the present invention will be described below.

In the integrated configuration in which the PMD compensation function and the optical amplification function with respect to the signal light Ls are realized at the same time, amplified spontaneous emission (ASE) light generated accompanying the optical amplification also becomes a factor which decreases the PMD monitoring accuracy. In the fourth embodiment, an improvement example in which not only the leaked light of the pumping light described above, but also an influence by the ASE light are taken into consideration, will be described.

Figure 17:
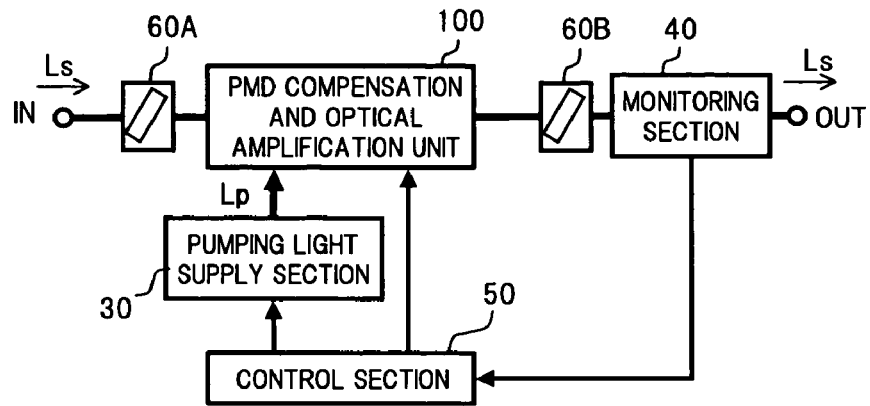
FIG. 17 is a functional block diagram showing the configuration of a fourth embodiment of the optical amplifier according to the present invention.

FIG. 17 is a functional block diagram showing the configuration of the optical amplifier of the fourth embodiment.

In FIG. 17, in the optical amplifier of this embodiment, optical filters 60A and 60B that transmit the signal light Ls but intercept the leaked light of the pumping light Lp and also intercept the ASE light are arranged respectively in the previous stage and in the subsequent stage of a PMD compensation and optical amplification unit 100. The PMD compensation and optical amplification unit 100 is a functional block in which the polarization control section 10 (or 10') and the PMD generation section 20 (or 20') in the above described respective embodiments are expressed as one system. The configuration of the parts other than the optical filters 60A and 60B inserted before and after the PMD compensation and optical amplification unit 100 is the same as that of the first or the second embodiment, and hence the description thereof is omitted here.

Figure 18:
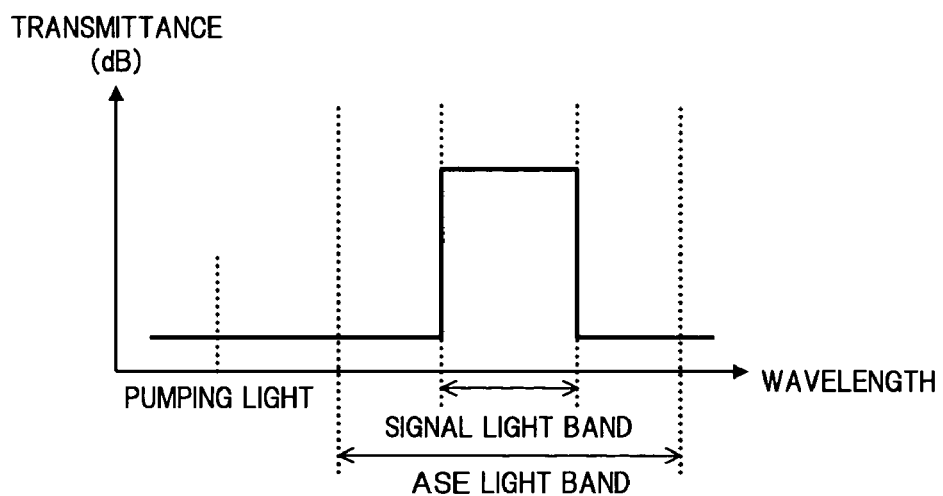
FIG. 18 shows one example of a transmission characteristic of an optical filter used in the fourth embodiment.

Each of the optical filters 60A and 60B are typical optical filters having a filter property, for example as shown in FIG. 18, such that the transmittance thereof is high with respect to the wavelength band of the signal light Ls, and low with respect to the wavelength of the pumping light Lp, and also low with respect to a wavelength band of the ASE light continuous on both ends on the short wavelength side and the long wavelength side of the wavelength band of the signal light Ls.

In the optical amplifier having such a configuration, the signal light Ls given to the input terminal IN is transmitted through the optical filter 60A and is sent to the PMD compensation and optical amplification unit 100, and is propagated through the polarization control section 10 and the PMD generation section 20 in the PMD compensation and optical amplification unit 100, to be subjected to the PMD compensation and the optical amplification simultaneously. At this time, the ASE light is generated with the optical amplification of the signal light Ls, to be propagated in directions the same as and opposite to the signal light Ls, respectively. The ASE light propagated in the same direction as the signal light Ls is sent from the PMD compensation and optical amplification unit 100 to the optical filter 60B on the output side, together with the signal light Ls and the leaked light of the forward pumping light, but only the signal light Ls is transmitted through the optical filter 60B to be sent to the monitoring section 40. Moreover, the ASE light propagated in the direction opposite to the signal light Ls is sent from the PMD compensation and optical amplification unit 100 to the optical filter 60A on the input side, together with the leaked light of the backward pumping light, but propagation of the ASE light and the leaked light of the backward pumping light to outside of the optical amplifier is intercepted by the optical filter 60A.

A part of the signal light Ls transmitted through the optical filter 60A on the output side is branched, as monitor light, by the branching device 41 in the monitoring section 40 to be sent to the output monitor 42. In the output monitor 42, the monitor light from the branching device 41 is used to monitor the PMD generation state and the output power of the signal light Ls.

As described above, according to the optical amplifier of the fourth embodiment, since the optical filters 60A and 60B which intercept the ASE light generated accompanying the optical amplification and the leaked light of the pumping light are arranged on the optical path of the main signal system, the PMD generation state of the signal light Ls can be monitored at high accuracy, without being affected by the ASE light and the leaked light of the pumping light Lp. Moreover, by intercepting the ASE light, a noise figure (NF) for the optical amplifier, and a ratio of the wideband ASE power to the signal light Ls can also be reduced. Furthermore, since unnecessary light is not output to outside of the optical amplifier, safety and reliability of the optical amplifier can also be improved.

In the fourth embodiment, the optical filters 60A and 60B that can intercept both the ASE light and the leaked light of the pumping light Lp are disposed. However, it is also possible to improve the monitoring accuracy and the like, by disposing an optical filter that intercepts either the ASE light or the leaked light of the pumping light Lp, on the optical path of the main signal system.

A fifth embodiment of the optical amplifier according to the present invention will be described below.

In the fifth embodiment, a preferable specific example in which for example, in the configuration of the first embodiment shown in FIG. 1, the optical transmission medium having birefringence of the PMD generation section 20 is provided in a plurality of stages (here, in two stages), will be described, with reference to FIG. 19 to FIG. 21.

Figure 19:
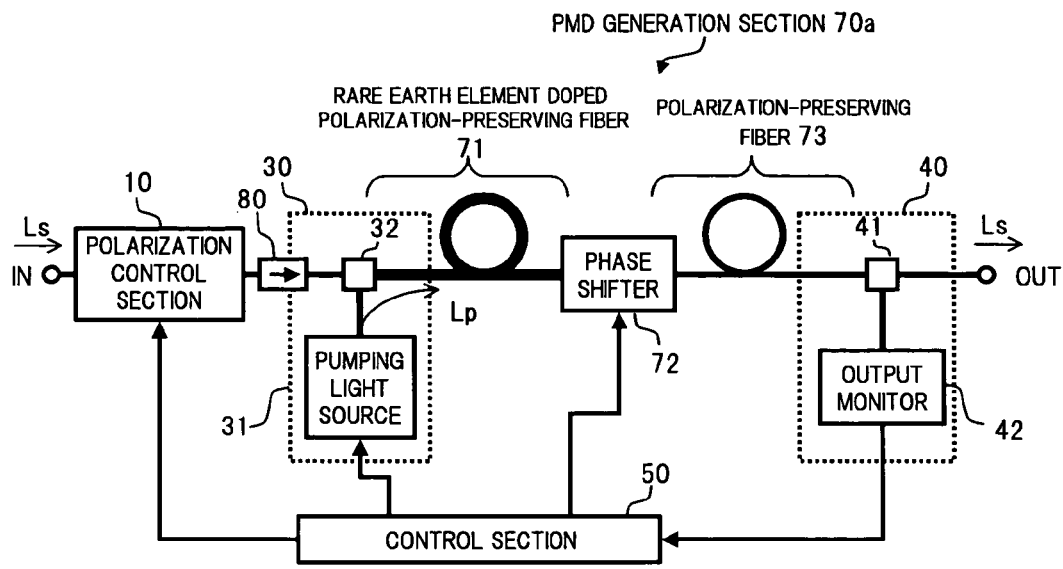
FIG. 19 is a functional block diagram showing one example in which a low NF characteristic can be realized in a fifth embodiment of the optical amplifier according to the present invention.

FIG. 19 is a functional block diagram showing one example, which can realize a low NF characteristic, in the optical amplifier having such two-stage PMD generation sections.

In the configuration example in FIG. 19, in a PMD generation section 70a having a two-stage configuration, in which a polarization-preserving fiber 71 on the input side and a polarization-preserving fiber 73 on the output side, as the optical transmission media having birefringence, are cascade-connected via a phase shifter 72, at least a core portion of the polarization-preserving fiber 71 on the input side is doped with a rare earth element, as in the case shown in FIG. 2. The pumping light supply section 30 that supplies the pumping light Lp to the PMD generation section 70a has a forward pumping configuration in which the multiplexer 32 is arranged between the polarization control section 10 and the polarization-preserving fiber 71 on the input side. Here, it is assumed that the operation of the phase shifter 72 in the PMD generation section 70a is controlled by a control signal from the control section 50, and an optical isolator 80 is arranged between the polarization control section 10 and the multiplexer 32.

According to the configuration of the optical amplifier as described above, since at least the polarization-preserving fiber 71 on the input side in the PMD generation section 70a is doped with a rare earth element so as to realize the forward pumping configuration, the signal light Ls propagated through the PMD generation section 70a is amplified mainly on the input side, and hence an optical amplifier having the low NF characteristic can be realized.

Figure 20:
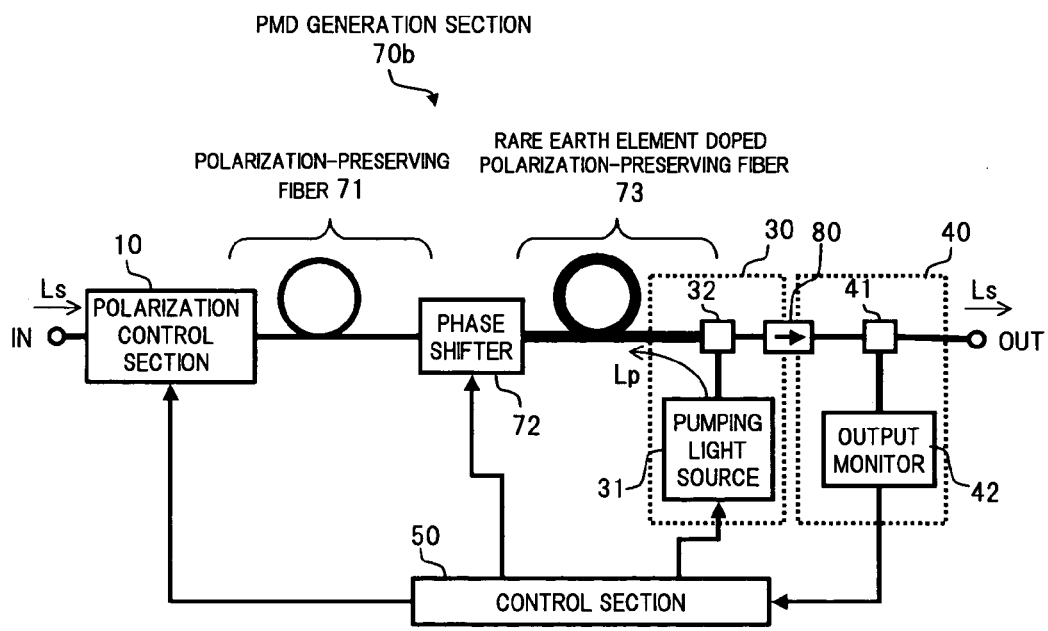
FIG. 20 is a functional block diagram showing one example in which high efficiency can be realized in the fifth embodiment.

FIG. 20 is a functional block diagram showing one example, which can realize high efficiency in the optical amplifier having two-stage PMD generation sections.

In the configuration example in FIG. 20, in a PMD generation section 70b having a two-stage configuration, in which the polarization-preserving fiber 71 on the input side and the polarization-preserving fiber 73 on the output side, as the optical transmission media having birefringence, are cascade-connected via the phase shifter 71, at least a core portion of the polarization-preserving fiber 73 on the output side is doped with a rare earth element, as in the case shown in FIG. 2. The pumping light supply section 30 that supplies the pumping light Lp to the PMD generation section 70b has a backward pumping configuration in which the multiplexer 32 is arranged between the polarization-preserving fiber 73 on the output side and the branching device 41 in the monitoring section 40. Here, it is assumed that the operation of the phase shifter 72 in the PMD generation section 70b is controlled by a control signal from the control section 50, and an optical isolator 80 is arranged between the multiplexer 32 and the branching device 41.

According to the configuration of the optical amplifier as described above, since at least the polarization-preserving fiber 73 on the output side in the PMD generation section 70b is doped with a rare earth element so as to realize the backward pumping configuration, the signal light Ls propagated through the PMD generation section 70b is amplified mainly on the output side, and hence an optical amplifier can be realized, in which the output efficiency is improved.

Figure 21:
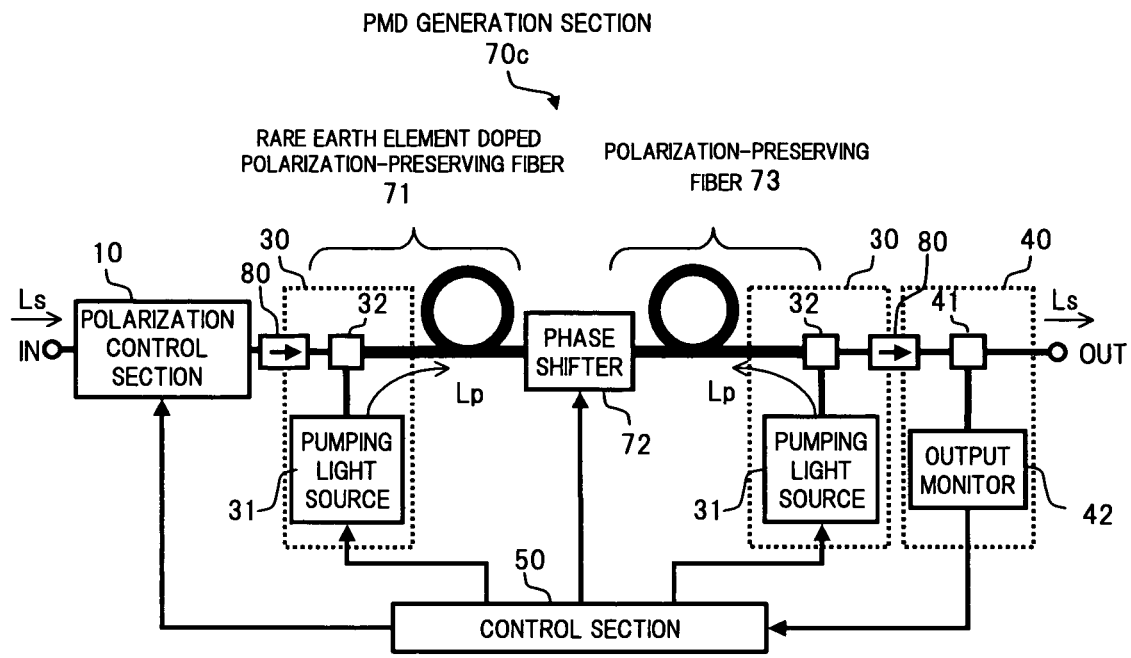
FIG. 21 is a functional block diagram showing one example in which the low NF characteristic and a high gain can be realized in the fifth embodiment.

FIG. 21 is a functional block diagram showing one example, which can realize the low NF characteristics and high gain in the optical amplifier having two-stage PMD generation sections.

In the configuration example in FIG. 21, the respective configurations shown in FIG. 19 and FIG. 20 are combined, to obtain a bi-directional pumping type configuration, in which the core portions of the polarization-preserving fibers 71 and 73 on the input side and output side in a PMD generation section 70c having the two-stage configuration are doped with a rare earth element, and forward pumping light Lp is supplied to the polarization-preserving fiber 71 on the input side, from the pumping light supply section 30 arranged between the polarization control section 10 and the polarization-preserving fiber 71, and backward pumping light Lp is supplied to the polarization-preserving fiber 73 on the output side, from the pumping light supply section 30 arranged between the monitoring section 40 and the polarization-preserving fiber 73. As a result, the signal light Ls propagated through the PMD generation section 70c is amplified over substantially the whole region thereof, thereby enabling realization of an optical amplifier that achieves both the low NF characteristic and high gain at the same time.

Figure 22:
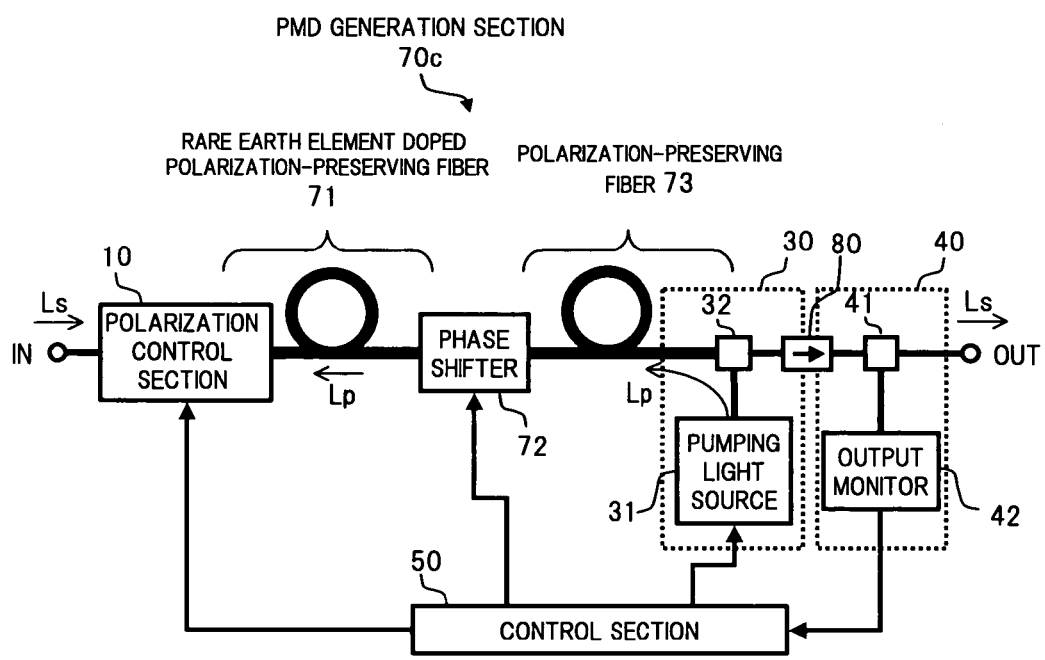
FIG. 22 is a functional block diagram showing another example related to the configuration shown in FIG. 21.

The configuration in the case where the rare earth element is doped on both of the polarization-preserving fibers 71 and 73 on the input and output sides of the PMD generation section 70c having the two-stage configuration is not limited to the bi-directional pumping type as shown in FIG. 21. For example, as shown in FIG. 22, the configuration may be such that the pumping light supply section 30 is arranged only between the polarization-preserving fiber 73 on the output side and the monitoring section 40, and after the backward pumping light Lp from the pumping light supply section 30 is supplied to the polarization-preserving fiber 73 on the output side, the residual pumping light is supplied to the polarization-preserving fiber 71 on the input side via the phase shifter 72. Moreover, although not shown in the figure, the pumping light supply section 30 may be arranged only between the polarization control section 10 and the polarization-preserving fiber 71 on the input side, so that the forward pumping light Lp is supplied to the respective polarization-preserving fibers 71 and 73 on the input and output sides sequentially.

A sixth embodiment of the optical amplifier according to the present invention will be described below.

In the sixth embodiment, an application example will be described, in which further miniaturization is achieved, for example, when a plurality of optical amplifiers in the first embodiment shown in FIG. 1 is used to perform the PMD compensation and the optical amplification.

Figure 23:
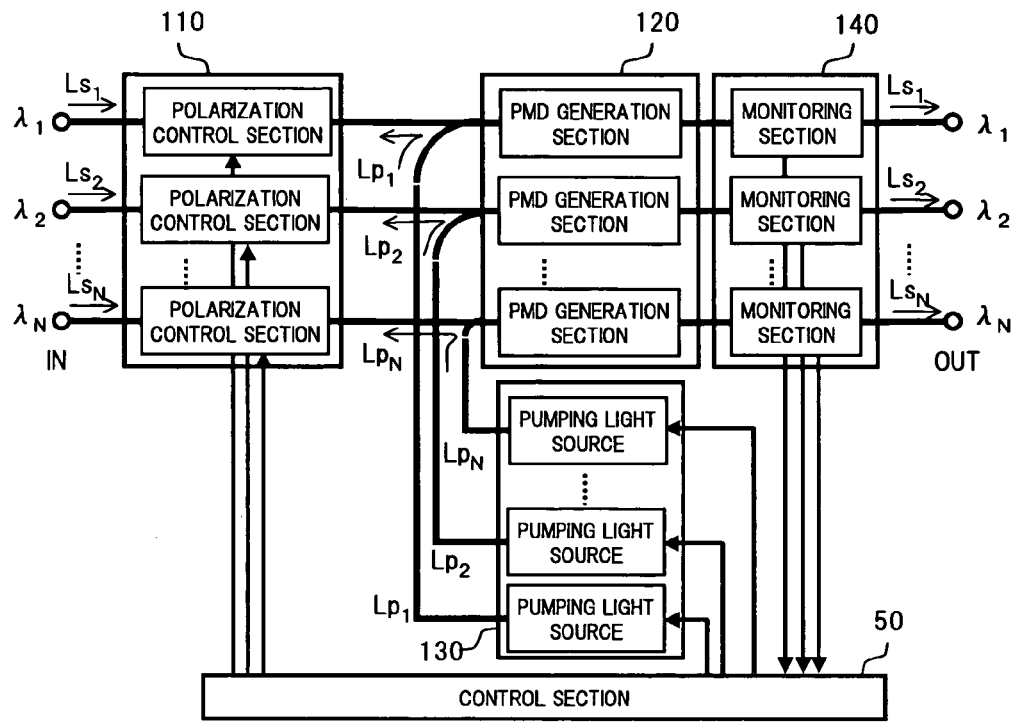
FIG. 23 is a functional block diagram showing the configuration of a sixth embodiment of the optical amplifier according to the present invention.

FIG. 23 is a functional block diagram showing the configuration of the optical amplifier of the sixth embodiment.

The optical amplifier shown in FIG. 23 comprises a polarization control section array 110, a PMD generation section array 120, a pumping light source array 130 and a monitoring section array 140, which are constructed by integrating polarization control sections, PMD generation sections, pumping light sources and monitoring sections, respectively, and are common components corresponding to signal lights $Ls_1$, $LS_2$, ..., $LS_3$ of wavelengths $\lambda_1$, $\lambda_2$, ..., $\lambda_N$ input via an input terminal array IN. In this optical amplifier, as in the first embodiment, the respective polarization control sections in the polarization control section array 110 and the pumping light sources in the pumping light source array 130 are feedback controlled by the control section 50, based on the monitoring result corresponding to the respective wavelengths $\lambda_1$ to $\lambda_N$ in the monitoring section array 140.

By means of the above configuration in which common devices are integrated (arrayed), miniaturization and low cost can be effectively realized for optical amplifiers that perform the PMD compensation and the optical amplification corresponding to the plurality of signal lights $Ls_1$ to $Ls_N$. More specifically, for example, an effect in the case where the PMD compensation and the optical amplification corresponding to an eight-wave signal light are performed can be estimated as described below. Here, a conventional configuration is assumed in which an eight waves-compliant PMD compensator module which uses a polarization-preserving fiber, and an eight waves-compliant optical amplifier module which compensates for a loss in the PMD compensator module, are connected by an optical fiber, and this conventional configuration is compared with the arrayed configuration according to the embodiment of the present invention. In the conventional configuration, when a proportion (size ratio) of the space of the respective components to the space excluding the PMD compensator module (a space required for the optical amplifier module and the connecting fiber between modules) is calculated, the result is as shown in Table 1 below.

TABLE 1

| | Item | Size ratio | Application of present invention |
|---|---|---|---|
| 1 | Space required for arranging optical fiber for connecting modules (R25) | 20% | Space-saving possible by integration |

TABLE 1-continued

| | Item | Size ratio | Application of present invention |
|---|---|---|---|
| 2 | Space required for arranging optical fiber within optical amplifier module housing (R25) | 30% | Space-saving possible by sharing |
| 3 | Space required for mechanism housing | 2% | Space-saving possible by sharing |
| 4 | Space required for optical amplification medium | 23% | Space-saving possible by sharing |
| 5 | Space required for output monitor | 2% | Space-saving possible by sharing |
| 6 | Space required for pumping light source | 20% | Space-saving difficult |
| 7 | Space required for multiplexer of pumping light | 2% | Space-saving difficult |
| 8 | Space required for electrical wiring such as of control section | 1% | Space-saving partly possible |

However, the fiber in item Nos. 1 and 2 in Table 1 causes a problem such as a loss, an increase of PMD or mechanical breakage, if wound too small. Therefore, an index named an allowable winding radius corresponding to the fiber type is used. Here, a typical fiber allowable winding radius of 25 mm is assumed, to calculate the size ratio. Of the spaces shown in each item in the conventional configuration, assumed as shown in Table 1, the space which can be saved by integrating or sharing the parts by applying the embodiments corresponds at least to each of the spaces shown in item Nos. 1 to 5, and the sum of the size ratio can be estimated as 77%. Therefore, assuming that the space ratio of the PMD compensator module to the optical amplifier module in the conventional configuration is 1:1, and calculating a relative ratio of the whole space for when space-saving is achieved by applying the embodiments, the result as shown in Table 2 below can be obtained. From Table 2, it is seen that an effect of space-saving of about 40% can be obtained by the configuration in the embodiments.

TABLE 2

| | Optical amplifier + portion corresponding to connecting fiber | Portion corresponding to PMD compensator | Total |
|---|---|---|---|
| Conventional configuration | 1.2 (1 + 0.2 for connecting fiber) | 1 | 2.2 |
| Configuration in the embodiments | 0.23 (1 − 0.77 for space-saving in Table 1) | 1 | 1.23 |

Figure 24:
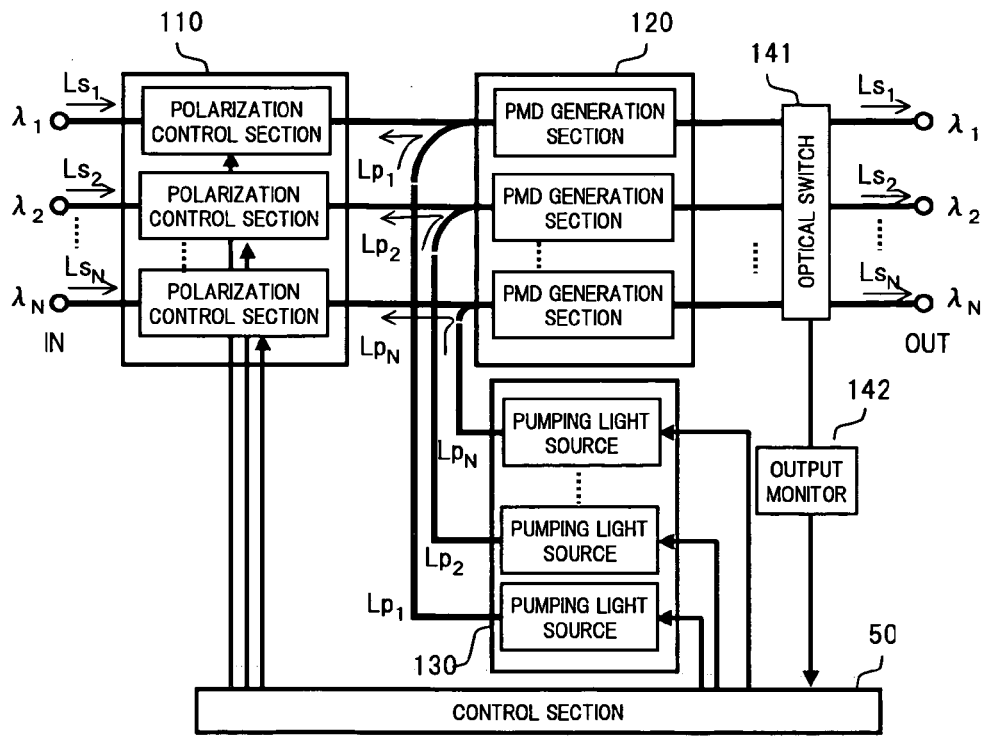
FIG. 24 is a functional block diagram showing another configuration related to the sixth embodiment.

In the configuration in the sixth embodiment shown in FIG. 23, an example is shown in which the monitoring sections disposed corresponding to the respective signal lights $Ls_1$ to $Ls_N$ are arranged in an array. However, for example as shown in FIG. 24, it is also possible to send the respective signal lights $Ls_1$ to $Ls_N$ output from the PMD generation section array 120 to an output monitor 142, while switching the signal lights by a common optical switch 141,

What is claimed is:

1. An optical amplifier having a polarization mode dispersion compensation function comprising:
a polarization control section that is configured to control a polarization plane angle of input signal light to produce variable polarization states;
a polarization mode dispersion generation section that has an optical transmission medium which has birefringence set to give a differential group delay between orthogonal polarization mode components of the signal light controlled in said polarization control section, and which is doped with a rare earth element;
a pumping light supply section that is configured to apply pumping light capable of pumping said rare earth element, to the optical transmission medium in said polarization mode dispersion generation section;
a monitoring section that is configured to monitor a polarization mode dispersion generation state of the signal light output from said polarization mode dispersion generation section; and
a control section that is configured to control said polarization control section so that polarization mode dispersion monitored in said monitoring section, is reduced.

2. An optical amplifier having a polarization mode dispersion compensation function according to claim 1,
wherein said monitoring section monitors the power of signal light output from said polarization mode dispersion generation section, and
said control section controls said pumping light supply section so as to obtain a gain which makes the power of signal light monitored by said monitoring section to be the power at the time of input or above.

3. An optical amplifier having a polarization mode dispersion compensation function according to claim 1,
wherein said monitoring section monitors the power of signal light output from said polarization mode dispersion generation section, and
said control section controls said pumping light supply section so that the power of signal light monitored by said monitoring section is fixed to be constant at a previously set value.

4. An optical amplifier having a polarization mode dispersion compensation function according to claim 1,
wherein said polarization mode dispersion generation section uses a polarization-preserving fiber as said optical transmission medium, and a light propagation region centering on a core of said polarization-preserving fiber is doped with a rare earth element.

5. An optical amplifier having a polarization mode dispersion compensation function according to claim 1,
wherein said polarization mode dispersion generation section uses an optical waveguide having birefringence which is formed on a substrate, as said optical transmission medium, and at least the optical waveguide on said substrate is doped with a rare earth element.

6. An optical amplifier having a polarization mode dispersion compensation function according to claim 5,
wherein said optical waveguide is an optical waveguide made of lithium niobate.

7. An optical amplifier having a polarization mode dispersion compensation function according to claim 5,
wherein said optical waveguide is an optical waveguide having variable refraction index, which is formed in a planar lightwave circuit.

8. An optical amplifier having a polarization mode dispersion compensation function according to claim 5,
wherein said polarization control section has an optical transmission medium of optical waveguide type doped with a rare earth element, and
said pumping light supply section supplies pumping light to each optical transmission medium of said polarization control section and said polarization mode dispersion generation section.

9. An optical amplifier having a polarization mode dispersion compensation function according to claim 1,
wherein said monitoring section comprises:
a branching device which branches a part of the signal light output from said polarization mode dispersion generation section, as monitor light;
an output monitor which monitors a power and the polarization mode dispersion generation state of the monitor light branched by said branching device; and
a pumping light interception device having a property for transmitting the signal light and intercepting the pumping light, which prevents leaked light of the pumping light supplied to said polarization mode dispersion generating section, from being input to said output monitor.

10. An optical amplifier having a polarization mode dispersion compensation function according to claim 9,
wherein said pumping light interception device is an optical filter, which transmits the signal light and intercepts the pumping light, arranged on an optical path of a main signal system positioned between said polarization mode dispersion generation section and said branching device, or on an optical path of a monitor system positioned between said branching device and said output monitor.

11. An optical amplifier having a polarization mode dispersion compensation function according to claim 9,
wherein said pumping light interception device is an optical isolator in which a loss is greater to the pumping light than to the signal light, arranged on an optical path of a main signal system positioned between said polarization mode dispersion generation section and said branching device.

12. An optical amplifier having a polarization mode dispersion compensation function according to claim 1,
wherein an optical filter having a property for transmitting the signal light and intercepting the pumping light and amplified spontaneous emission light generated accompanying amplification of the signal light in said polarization mode dispersion generation section, is provided on an optical path through which the signal light is propagated.

13. An optical amplifier having a polarization mode dispersion compensation function according to claim 1,
wherein when said polarization mode dispersion generation section is constructed by cascade connecting a plurality of optical transmission media having birefringence, a rare earth element is doped on at least the optical transmission media disposed on the signal light input side among said plurality of optical transmission media, and
said pumping light supply section supplies forward pumping light to the optical transmission media doped with the rare earth element, of said polarization mode dispersion generation section.

14. An optical amplifier having a polarization mode dispersion compensation function according to claim 1,
wherein when said polarization mode dispersion generation section is constructed by cascade connecting a plurality of optical transmission media having birefringence, a rare earth element is doped on at least the optical transmission media disposed on the signal light output side among said plurality of optical transmission media, and
said pumping light supply section supplies backward pumping light to the optical transmission media doped with the rare earth element, of said polarization mode dispersion generation section.

15. An optical amplifier having a polarization mode dispersion compensation function according to claim 1,
wherein when said polarization mode dispersion generation section is constructed by cascade connecting a plurality of optical transmission media having birefringence, a rare earth element is doped on said plurality of optical transmission media, and
said pumping light supply section supplies forward pumping light to the optical transmission media disposed on the signal light input side, and supplies backward pumping light to the optical transmission media disposed on the signal light output side, among the plurality of optical transmission media doped with the rare earth element, of said polarization mode dispersion generation section.

16. An optical amplifier having a polarization mode dispersion compensation function,
wherein the optical amplifier of claim 1 is made of one unit, and a plurality of units are disposed in parallel corresponding to a plurality of signal lights contained in a wavelength group, and common components of said units are integrated.

17. An optical amplifier having a polarization mode dispersion compensation function according to claim 16,
wherein a configuration where common monitoring sections of said units are integrated, is provided with:
an optical switch which selects any one of the signal lights output from the polarization mode dispersion generation sections of the respective units and outputs a part of said signal light, as monitor light; and
an output monitor which is shared by each of said units, and which monitors the polarization mode dispersion generation state and an optical power of the monitor light output from said optical switch.

18. An optical amplifier having a polarization mode dispersion compensation function, comprising:
a polarization control section that is configured to control a polarization plane angle of input signal light to produce variable polarization states;
a polarization mode dispersion generation section having an optical transmission medium with a rare earth element;
a pumping light supply section that is configured to apply pumping light to the optical transmission medium;
a monitoring section that is configured to monitor a polarization mode dispersion generation state of the signal light output from said polarization mode dispersion generation section; and
a control section that is configured to control said polarization control section, so that polarization mode dispersion monitored in said monitoring section, is reduced.

* * * * *